Figure 1:
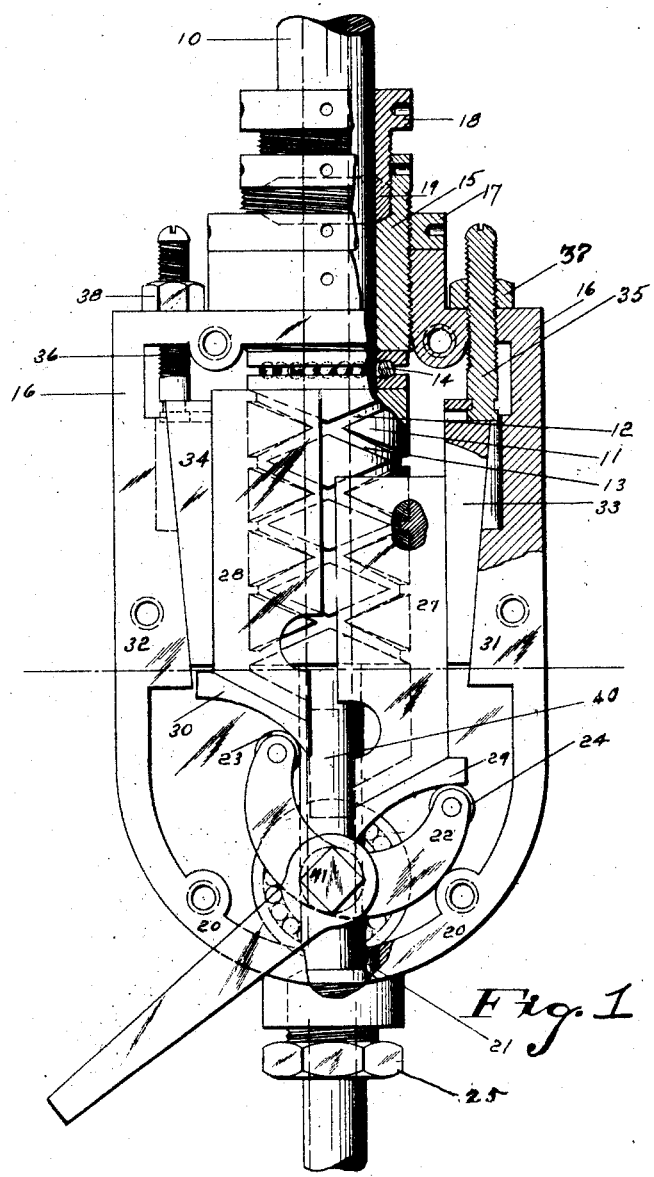

No. 883,179. PATENTED MAR. 31, 1908.
H. B. DITWILER.
STEERING GEAR FOR MOTOR MACHINES.
APPLICATION FILED NOV. 7, 1907.

2 SHEETS—SHEET 1.

Witnesses.
R. H. Decker
Frank Steiner

Inventor.
Homer B. Ditwiler
by Jell G. Roe Atty.

No. 883,179. PATENTED MAR. 31, 1908.
H. B. DITWILER.
STEERING GEAR FOR MOTOR MACHINES.
APPLICATION FILED NOV. 7, 1907.
2 SHEETS—SHEET 2.
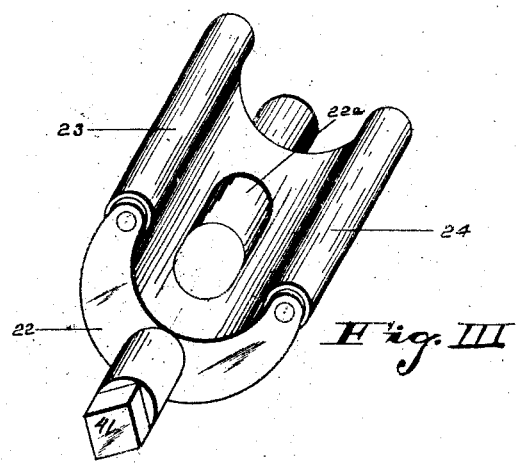
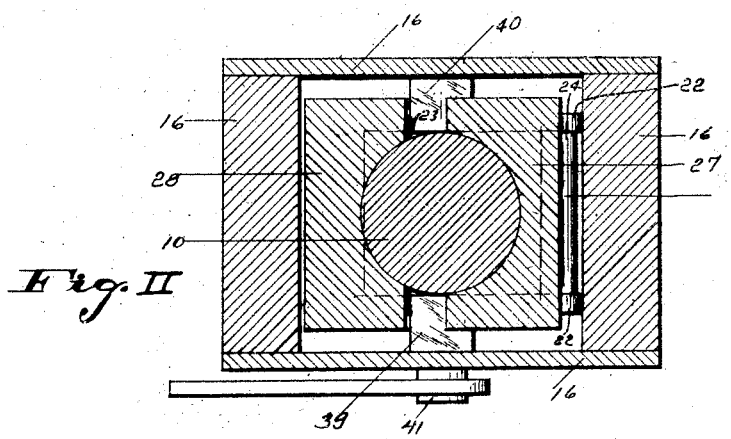

UNITED STATES PATENT OFFICE.

HOMER B. DITWILER, OF MANSFIELD, OHIO, ASSIGNOR OF ONE-FOURTH TO LEWIS W. ROE, OF MANSFIELD, OHIO.

STEERING-GEAR FOR MOTOR-MACHINES

No. 883,179.  Specification of Letters Patent.  Patented March 31, 1908.

Application filed November 7, 1907. Serial No. 401,075.

*To all whom it may concern:*

Be it known that I, HOMER B. DITWILER, a citizen of the United States, residing in Mansfield, county of Richland, and State of Ohio, have invented a new and useful Improvement in Steering-Gear for Motor-Machines, of which the following is a specification.

The object of my invention is to provide a steering gear for motor machines in which the degree of looseness, commonly called play, of the shaft, may be regulated by the operator or entirely eliminated, if desired.

A further object is to provide a means of operating two movable blocks upon a right and left worm shaft, in a steering gear, and to cause said blocks to move in diverse directions when the steering shaft is operated.

A further object is to provide a crescent shaped yoke adapted to be operated by movable blocks, as aforesaid, said yoke being connected with, and designed to operate, the steering levers.

Another object is to provide all of the aforesaid means in a simple, strong, durable and inexpensive construction.

My invention consists of certain details of construction hereinafter set forth, pointed out in my claims and illustrated in the accompanying drawings in which Figure I shows a front elevation view of my device, the near longitudinal side of the boxing being removed, and a part of said view being in section; Fig. II shows a transverse section of the boxing taken on the transverse broken line of Fig. I; and, Fig. III shows a detail view of the yoke I employ.

Referring to the accompanying drawings the reference numeral 10 is used to indicate the steering shaft of a motor car provided, near its center, with an enlarged portion 11 in which is a right and a left screw thread channel, 12 and 13 respectively, said channels being exactly similar and pitched to the same degree. In the upper surface of the enlarged portion 11, and adjacent to the shaft 10, I have provided a groove designed to receive balls 14 for a bearing for an adjustable sleeve 15, provided on its under surface with a groove to receive the said balls. The said sleeve 15 is provided, on its outer surface, with screw threads designed to engage internal screw threads in an opening forming a neck for the boxing 16 which I employ said boxing being designed to incase the enlarged portion 11 of the shaft. The sleeve 15 is locked in its position by a nut 17, and I have provided also a nut 18 to engage the upper inner portion of said sleeve and between the nut 18 and sleeve 15 and shaft 10 I have provided a space designed to receive a packing 19.

The boxing 16 is rectangular in conformation and extends below the enlarged portion 11 of the shaft, two of its longitudinal sides being curved inwardly at their base thus obviously forming a circular base 20, as illustrated in the drawings, and in the center of the base I have provided an orifice 21 through which the shaft 10 is designed to project. Immediately above the circular base 20, and having its bearings in the sides of the boxing 16, which are not curved inwardly, I have mounted, for radial movement, a yoke 22, which is also provided with a centrally located orifice 22ª through which the shaft 10 is designed to pass. The base of said yoke is straight, longitudinally, but with upwardly curving sides, forming, in its entirety, a semi-circular base, as illustrated, and the upper portion of said yoke is concaved, for purposes hereinafter set forth. At the upper extremity of each longitudinal side I have mounted a roller 23 and 24, respectively, said rollers projecting upwardly beyond their respective sides. On the shaft 10, at the point where it passes through the orifice 21, I have mounted a lock nut 25 designed to engage a stuffing box attachment, secured to the boxing, and to be secured therein.

The numerals 27 and 28 indicate movable blocks, mounted on opposite sides of the enlarged portion 11 of the shaft, the block 27 being provided with a right pitched screw thread and the block 28 being provided with a left pitched screw thread, said screw threads being designed to engage their respective channels in the enlarged portion 11. The base of each of said blocks is pitched inwardly, toward the shaft, on a downwardly inclined plane and its under surface is slightly concaved, as shown at 29 and 30 respectively. The blocks are so mounted on the shaft that their under surfaces are always in engagement with their respective rollers on the yoke 22 and when the said blocks are directly opposite each other the yoke is designed to be resting in its normal position, its two rollers directly opposite and in line with each other.

On the inner surface of each of the longitudinal sides of the boxing 16, adjacent to the blocks 27 and 28, I have provided a lug, 31 and 32 respectively, its inner face being beveled on an upwardly and outwardly inclined plane and between the said lug and its respective block I have mounted a plate, 33 and 34 respectively, its outer face being beveled in like manner, to the lug but reversed thus obviously causing the two beveled sides to engage each other. On the upper portion of each of the plates 33 and 34 I have secured, for rotary movement, a screw shaft 35 and 36 respectively, its upper end being in engagement with a lock nut 37 and 38 respectively, on the upper surface of the boxing 16. By this means it is obvious that the plates 33 and 34 are adjustable.

Mounted on each of the longitudinal sides, at right angles to the axis of the yoke 22, in such a manner that one of its lateral edge surfaces is engaging the inner portion of the lower extremity of the block 27 and its other lateral edge surface is engaging the inner portion of the lower extremity of the block 28, is an oblong lug 39 and 40 respectively, said lugs being exactly similar in every respect and designed as guides for the movable blocks, 27 and 28, at their lower extremities.

The boxing 16 is designed to be anchored to the machine and the lower end of shaft 10 is also designed to be anchored to the machine and the steering levers are secured to the shaft 41 of the yoke 22 said shaft protruding through an orifice in the boxing.

In practical operation when the driver turns the steering shaft 10, one of the blocks 27 or 28 will be forced downwardly against its respective side of the yoke 22 and at the same time the pressure upon the opposite side of the yoke, caused by the contact and rigid position of the opposite block, is removed, as the said block moves upward and it is obvious that this will cause the said yoke to be moved, radially, from its bearings and it is equally obvious that this will cause the steering lever to be moved in a like manner. It is obvious that a reverse movement of the steering shaft will cause a reverse movement of the steering lever. The wedge shaped plates 33 and 34 may be adjusted so as to provide any space desired between the steering shaft 10 and the blocks 27 and 28 or it may be so closely adjusted as to cause the said blocks to be in an extremely close engagement with the said shaft. It is obvious that a variance of the space between the steering shaft 10 and the said blocks will cause different degrees of play or looseness in the steering mechanism.

The shaft 10 is secured both above and below, in the boxing, as hereinbefore described and is adjustable, with relation to the boxing, by means of the adjusting sleeve 15. As the yoke 22 is mounted in the boxing 16, as described, it is obvious that adjustment of the shaft 10 to the boxing will cause adjustment of the blocks 27 and 28 to the yoke 22.

Having thus described my invention what I claim and desire to secure by Letters Patent of the United States is:—

1. In a steering gear for motor machines, a steering shaft formed with right and left screw threads, companion blocks having relatively opposite threads for engagement with the threads of said shaft, said blocks being formed with concave under faces and a yoke mounted for rocking movement and having its ends free and in constant contact with the corresponding concave under faces of said blocks.

2. In a steering gear for motor machines a casing having opposite inner faces oppositely inclined, a shaft having right and left threads, companion blocks having relatively opposite threads for engagement with the threads of said shaft, a rocking member actuated by said blocks, plates bearing against each and having their outer faces inclined correspondingly to said respective inclined inner faces with which they lie in contact and means for moving each plate in either direction along said inclined inner faces.

3. In a steering gear for motor machines, the combination with a right and left threaded steering shaft and movable blocks thereon and a yoke designed to be operated by said blocks; a rectangular boxing curved at its base comprising in combination two longitudinal sides curved at their base, a rectangular lug mounted centrally on the inner portion near the lower end of each of said longitudinal sides, said lugs being directly opposite to each other and designed to operate as companions, two other longitudinal side portions, provided with wedge shaped lugs on their inner surfaces, said boxing having an orifice centrally located in the top thereof all arranged and combined substantially as shown and described.

4. A steering gear for motor machines comprising in combination a steering shaft provided with right and left screw threads; a boxing incasing said screw threaded portion; movable companion blocks within said boxing one designed to be operated by the right screw threads and the other by left screw threads on the said steering shaft; said blocks each having inwardly inclined lower surfaces;

a yoke concaved in its upper surface mounted in the said boxing immediately below and between the said movable blocks, said yoke having an orifice centrally thereof; rectangular lugs mounted in the said boxing, in such a position as to cause them to be between the said movable blocks at their lower extremities; means for adjusting the position of the movable blocks on the said shaft, substantially as shown and described.

HOMER B. DITWILER.

Witnesses:
 CHARLES W. CHEW,
 LOUIS R. STRAUB.